(12) United States Patent
Kishi et al.

(10) Patent No.: US 7,009,756 B2
(45) Date of Patent: Mar. 7, 2006

(54) ELECTROPHORETIC DISPLAY DEVICE

(75) Inventors: Etsuro Kishi, Sagamihara (JP);
Yoshinori Tomida, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/876,539

(22) Filed: Jun. 28, 2004

(65) Prior Publication Data

US 2004/0227985 A1 Nov. 18, 2004

Related U.S. Application Data

(62) Division of application No. 09/479,245, filed on Jan. 7, 2000.

(30) Foreign Application Priority Data

| Jan. 8, 1999 | (JP) | ................................. 11-003186 |
| Jan. 8, 1999 | (JP) | ................................. 11-003187 |
| Oct. 22, 1999 | (JP) | ................................. 11-301179 |
| Oct. 22, 1999 | (JP) | ................................. 11-301180 |

(51) Int. Cl.
*G02B 26/00* (2006.01)

(52) U.S. Cl. ..................... 359/296; 345/107; 349/86; 430/32

(58) Field of Classification Search ............... 359/296; 345/30, 43, 84, 107; 430/22, 30, 32, 311, 430/315, 321, 394, 38; 349/86–92
See application file for complete search history.

(56) References Cited

U.S. PATENT DOCUMENTS

| 3,668,106 | A | * | 6/1972 | Ota ............................. 358/305 |
| 3,756,693 | A | * | 9/1973 | Ota ............................. 345/107 |
| 3,763,392 | A | | 10/1973 | Ota |
| 3,792,308 | A | * | 2/1974 | Ota ............................. 315/150 |
| 3,892,568 | A | * | 7/1975 | Ota ............................. 430/19 |
| 4,203,106 | A | | 5/1980 | Dalisa et al. |
| 5,587,264 | A | | 12/1996 | Iijima et al. |
| 5,652,079 | A | | 7/1997 | Mochizuki et al. |
| 6,067,185 | A | | 5/2000 | Albert et al. |
| 6,144,361 | A | * | 11/2000 | Gordon et al. ............... 345/107 |
| 6,154,302 | A | | 11/2000 | Yagi et al. |
| 6,172,798 | B1 | | 1/2001 | Albert et al. |
| 6,239,896 | B1 | * | 5/2001 | Ikeda ........................... 359/240 |
| 6,241,921 | B1 | | 6/2001 | Jacobson et al. |
| 6,323,989 | B1 | * | 11/2001 | Jacobson et al. ........... 359/296 |
| 6,636,186 | B1 | | 10/2003 | Yamaguchi et al. |
| 6,842,167 | B1 | * | 1/2005 | Albert et al. ................ 345/107 |

FOREIGN PATENT DOCUMENTS

| JP | 01-086116 | 3/1989 |
| JP | 09-211499 | 9/1997 |
| JP | 11-202804 | 7/1999 |

* cited by examiner

*Primary Examiner*—Evelyn A. Lester
(74) *Attorney, Agent, or Firm*—Fitzpatrick, Cella, Harper & Scinto

(57) ABSTRACT

An electrophoretic display device capable of realizing a stable memory characteristic without relying on a circuit-open state is provided. The electrophoretic display device has a cell structure including at least two electrodes, fixing surfaces each associated with one of the at least two electrodes an electrophoretic layer disposed in the cell and comprising an insulating liquid and colored charged particles disposed in the electrophoretic layer, and voltage application device for applying a voltage between the electrodes thereby causing migration of the colored charged particles toward and collective attachment onto one of the fixing surfaces; wherein the fixing surfaces are provided with a charged film having a constant surface charge of a polarity opposite to that of the colored charged particles, regardless of a polarity of electricity supplied to the associated electrodes.

6 Claims, 9 Drawing Sheets

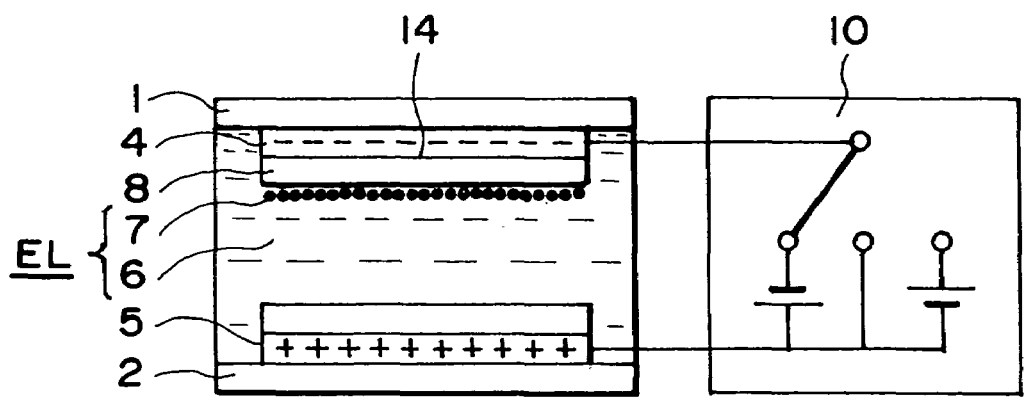
F I G. 3A
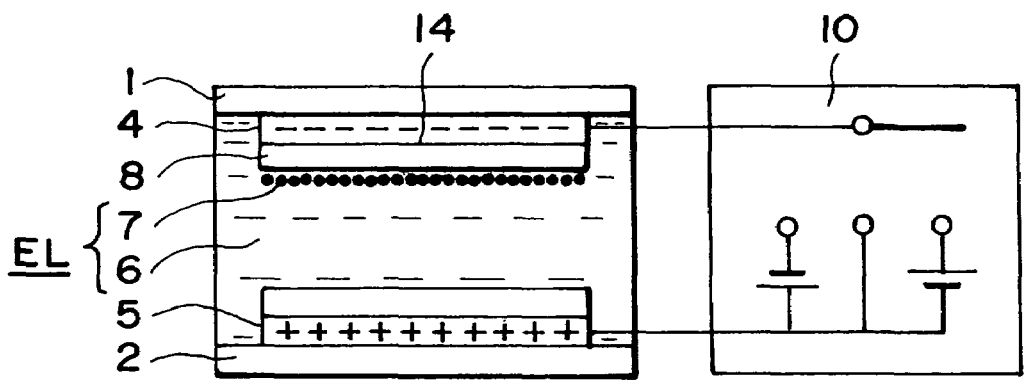
F I G. 3B
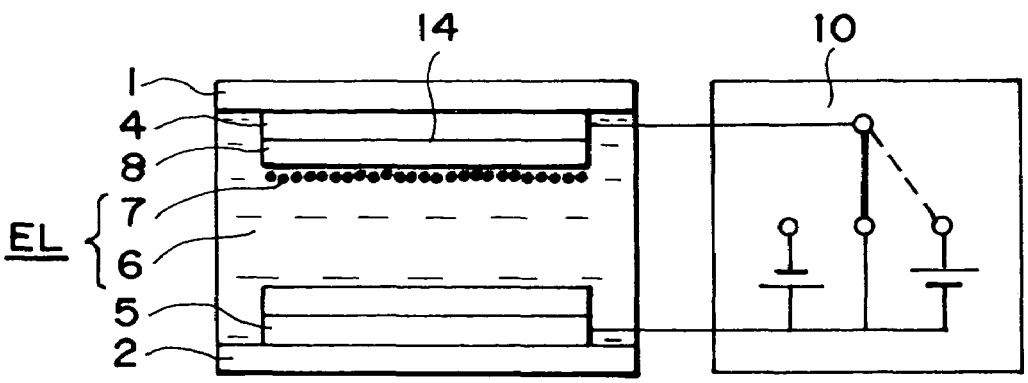
F I G. 3C

ELECTROPHORETIC DISPLAY DEVICE

This is a division of application Ser. No. 09/479,245, filed Jan. 7, 2000, now allowed.

FIELD OF THE INVENTION AND RELATED ART

The present invention relates to an electrophoretic display device wherein colored electrophoretic particles or charged migrating particles are moved to effect a display.

In recent years, accompanying the progress of data processing apparatus, there has been an increasing demand for a display device requiring a small power consumption and a small thickness, and extensive study and development have been made on devices satisfying such a demand. Among these, a liquid crystal display device wherein an alignment of liquid crystal molecules is electrically controlled to change optical characteristics has been extensively developed and commercialized as a display device satisfying the demand described above.

However, such liquid crystal display devices are still accompanied with problems of visual load on human eyes, such as difficulty of recognizing characters on display depending on a viewing angle or due to reflection light, and flickering and low luminance of light sources. Accordingly, extensive study is still made for new-types of display devices causing less visual load on human eyes.

Reflection-type display devices are expected from the viewpoints of lower power consumption and less visual load on human eyes. As a type thereof, there has been proposed an electrophoretic display device wherein colored charged particles are moved in an insulating liquid (e.g., in U.S. Pat. No. 3,668,106). FIG. 7 is a sectional view of a most typical example of such electrophoretic display device.

Referring to FIG. 7, an electrophoretic display device includes an electrophoretic layer EL comprising a colored insulating liquid 6 and colored charged particles 7 dispersed thereon, and a pair of or pairs of opposing electrodes 4 and 5 disposed to sandwich the electrophoretic layer EL, wherein the electrophoretic layer EL is supplied with a voltage via the opposing electrodes to cause the colored charged particles 7 to migrate toward and be fixed at an electrode biased to a polarity opposite to that of the colored charged particles 7 to effect a display by utilizing a difference between the color of colored charged particles 7 and a dyed color of the insulating liquid 6. More specifically, when the particles 7 are attached to the surface of the electrode 4 closer to the viewer, the color of the particles 7 is displayed, and when the particles 7 are attached to the electrode 5 remoter from the viewer, the color of the dyed insulating layer 7 is displayed.

However, such a conventional electrophoretic display device has involved problems as described below with reference to FIGS. 8A–8C, which illustrate the operation principle of such a conventional electrophoretic display device.

In a conventional electrophoretic display device, a display picture-retention characteristic (hereinafter referred to as "memory characteristic") is provided by applying a voltage across the electrophoretic layer EL from an external circuit 10 to form a picture display state (FIG. 8A), and making the circuit open immediately after the voltage application to retain a charge at the electrode 4, thereby continually attracting the colored charged particles 7 by a Coulomb's force exerted by the charge retained at the electrode 4 (FIG. 8B).

The memory characteristic is however lost when the voltage application circuit is short-circuited to discharge the retained charge (FIG. 8C). Accordingly, in case where a picture is written by a matrix drive, it is necessary to provide each pixel with a switching device and effect an independent control of an open/close circuit state at each pixel. Such an active matrix drive requires a device of a complicated structure, which incurs an increased production cost.

Further, even under an open circuit state as shown in FIG. 8B, a slight leakage of charge retained at the electrode gradually proceeds through the electrophoretic layer EL Accordingly, even if the electrophoretic layer is set to have a high specific resistance on the order of $10^{15}$ ohm.cm, the available memory time is at most ten and several hours to several tens hours and cannot be said to be sufficient.

SUMMARY OF THE INVENTION

In view of the above-mentioned problems, an object of the present invention is to provide an electrophoretic display device capable of realizing a stable memory characteristic for a long period without relying on a charge retained at electrodes or requiring a switching control between open and closed states.

According to the present invention, there is provided an electrophoretic display device of a cell structure, comprising: at least two electrodes, fixing surfaces each associated with one of said at least two electrodes, an electrophoretic layer disposed in the cell and comprising an insulating liquid and colored charged particles disposed in the electrophoretic layer, and voltage application means for applying a voltage between the electrodes thereby causing migration of the colored charged particles toward and collective attachment onto one of the fixing surfaces; wherein at least one of the fixing surfaces and the colored charged particles is provided with an adhesive layer allowing repetitive attachment thereto and separation therefrom of the colored charged particles.

According to another aspect of the present invention, there is provided an electrophoretic display device of a cell structure, comprising: at least two electrodes, fixing surfaces each associated with one of said at least two electrodes, an electrophoretic layer disposed in the cell and comprising an insulating liquid and colored charged particles disposed in the electrophoretic layer, and voltage application means for applying a voltage between the electrodes thereby causing migration of the colored charged particles toward and collective attachment onto one of the fixing surfaces; wherein the fixing surfaces are provided with a charged film having a constant surface charge of a polarity opposite to that of the colored charged particles.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 3A–3C are schematic sectional views for illustrating an operation principle of an embodiment of the electrophoretic display device according to the invention.

DESCRIPTION OF THE PREFERRED EMBODIMENTS (First Embodiment)

An electrophoretic display device according to this embodiment of the present invention is characterized by having a cell structure including: at least two electrodes, fixing surfaces each associated with one of the two electrodes, an electrophoretic layer disposed in the cell and comprising an insulating liquid and colored charged particles disposed in the electrophoretic layer, and voltage application means for applying a voltage between the electrodes thereby causing migration of the colored charged particles toward and collective attachment onto one of the fixing surfaces; wherein at least one of the fixing surfaces and the colored charged particles is provided with an adhesive layer allowing repetitive attachment thereto and separation therefrom of the colored charged particles.

The adhesive layer as a characteristic of this embodiment may be disposed on only the fixing surfaces, on only the surface of the colored charged particles, or on both of the fixing surfaces and the surface of the colored charged particles. In case where the adhesive layers is disposed on only one of the fixing surfaces and the colored charged particles, the other may preferably be composed of a material selected so as to impart optimum adhesiveness and peelability to the adhesive layer in consideration of the fact that adhesiveness and peelability are largely affected by the surface energy and solubility parameter of the other side material.

The adhesive layer is required to allow repetitive attachment thereto and separation therefrom of the colored charged particles, to be insoluble in the insulating liquid and, in case where it is formed on the surface of the colored charged particles, not to impair the dispersibility of the colored charged particles in the insulating layer.

For comply with these requirements, the adhesive layer may suitably comprise a polymer having a glass transition temperature (Tg) of −35° C. to +35° C. and comprising at least one polymer species selected from the group consisting of poly(meth)acrylate esters, poly(meth)acrylic acid poly (meth)acrylonitrile, poly(meth)acrylamide, polyvinyl esters and polyvinyl ethers, so as to provide a tackiness at an operating temperature suitable for repetitive attachment and peeling as exhibited by "Post-it" (trade name, available from 3M Co.) extensively used as memo-slip or tag paper.

Figure 1:
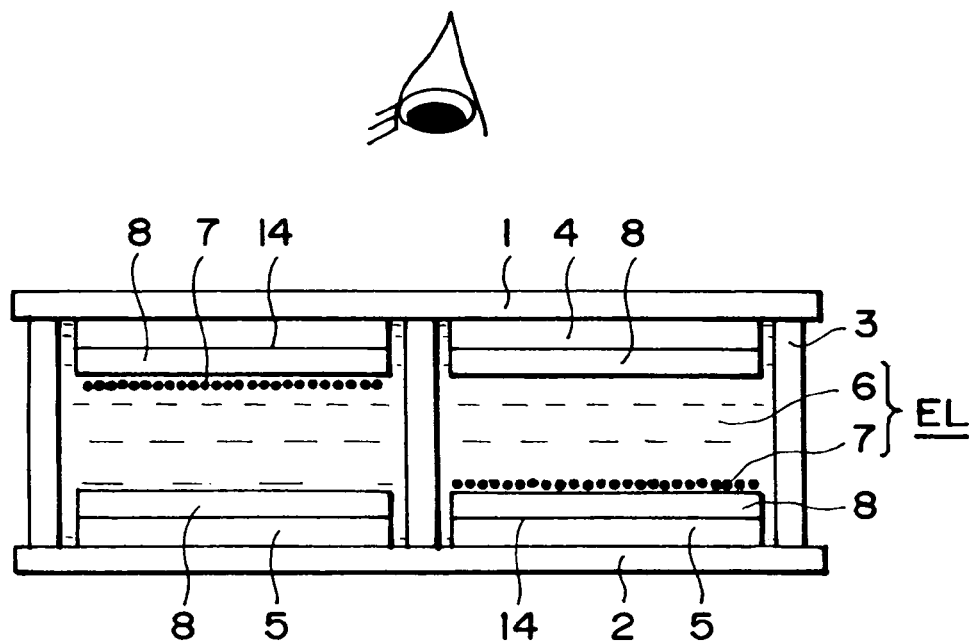
FIG. 1 is a schematic sectional view of an embodiment of the electrophoretic display device according to the invention.

FIG. 1 is a schematic sectional view of an embodiment of the electrophoretic display device according to the present invention. An electrophoretic display device shown in FIG. 1 includes two (closed) cell structures, each of which comprises a transparent (display-side) substrate 1, a counter substrate 2 and a partitioning wall 3 to form a cell, which is filled with an electrophoretic layer EL comprising a colored insulating layer 6 and colored charged particles 7 colored in a different color from the colored insulating layer 6. In each cell, the transparent display substrate 1 has thereon a transparent display electrode 4, and the counter substrate 2 has thereon a counter electrode 5. Each of the transparent display electrode 4 and the counter electrode 5 has a fixing surface 13 onto which the colored charged particles 7 are collectively attached. The fixing surface 13 is coated with an adhesive layer 8 allowing repetitive attachment thereto and separation therefrom of the colored charged particles 7.

Now, the operation principle for a unit cell of the display device will be described with reference to FIGS. 3A to 3C. As explained with reference to FIG. 1, each cell structure of the display device includes mutually opposing two substrates 1 and 2, a transparent display electrode 4 formed on the transparent display substrate 1, a counter electrode 5 formed on the counter electrode 2, a colored insulating layer 6 disposed between the opposing electrodes 4 and 5, colored charged particles 7 dispersed in the colored insulating layer 6 (and assumed herein to be positively charged), and adhesive layers 8.

Now, if an external circuit 10 is connected as shown in FIG. 3A to induce a negative charge at the transparent display electrode 4 and a positive charge at the counter electrode 5, the positively charged colored charged particles 7 are collected and attached onto the transparent display electrode 4, whereby the display surface exhibits the color of the colored charged particles 7.

Then, if the external circuit 10 is turned open as shown in FIG. 3B, the charges on the respective electrodes are retained, whereby the colored charged particles 7 are fixedly attached onto the transparent display electrode 4 due to an electrostatic attractive force exerted by the retained charge.

Now, if the external circuit 10 is short-circuited as shown in FIG. 3, the charges retained at the electrodes 4 and 5 are released to lose the electrostatic attraction. In this state, however, the colored charged particles 7 are retained by attachment or adsorption to the adhesive layer 8 formed on the electrode 4, thus retaining the display state.

Accordingly, even in a drive system such as a simple matrix drive wherein the circuit-open state is not effectively retained, a good memory characteristic is exhibited. Further, as the surface charge on the adhesive layer 8 is never released, a stable memory characteristic can be realized for a long period.

On the other hand, the rewriting of a display state is performed by peeling or separating the colored charged particles 7 from the adhesive layer 8 on the electrode 4 by applying reverse-polarity voltages to the electrodes 4 and 5 by connecting the external circuit 10 as represented by a dotted line in FIG. 3C, i.e., to apply a positive charge to the electrode 4 and a negative charge to the electrode 5, so as to exert an energy exceeding a drive voltage threshold corresponding to the adsorption energy of the adhesive layer 8. In this way, by optimizing the adhesive force exerted by the adhesive layer 18, it becomes possible to design threshold characteristics essential for a simple matrix drive.

Figure 4:
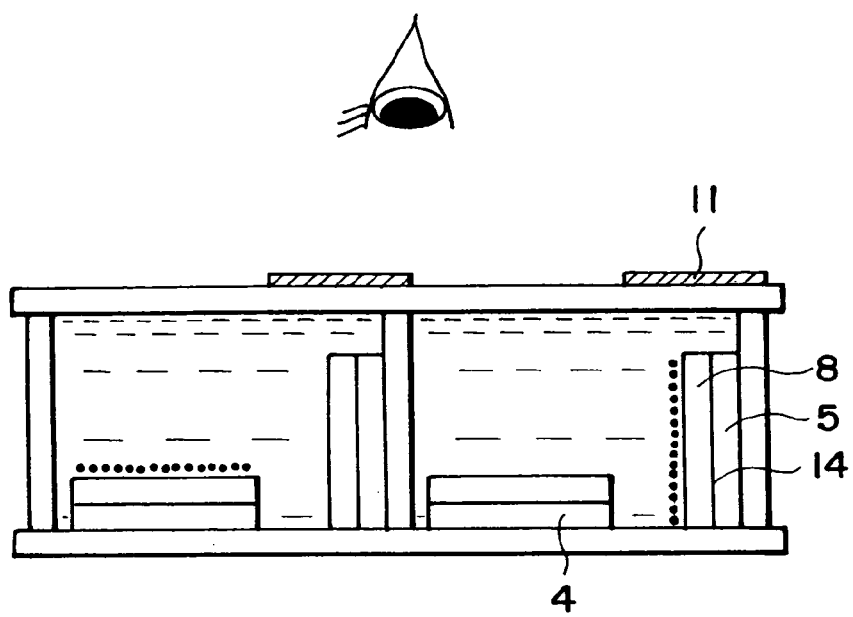
FIGS. 4–6 respectively show another embodiment of the electrophoretic display device according to the invention.
Figure 6:
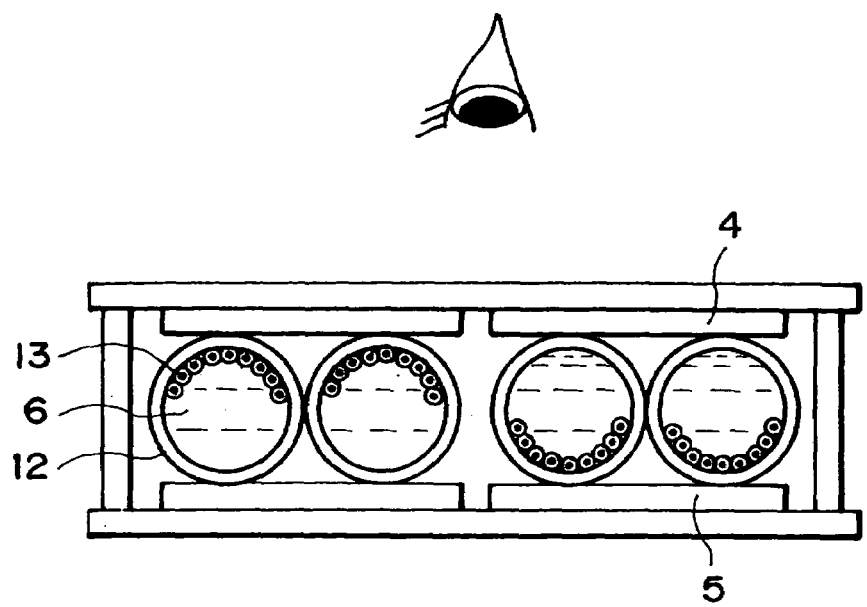
Figure 7:
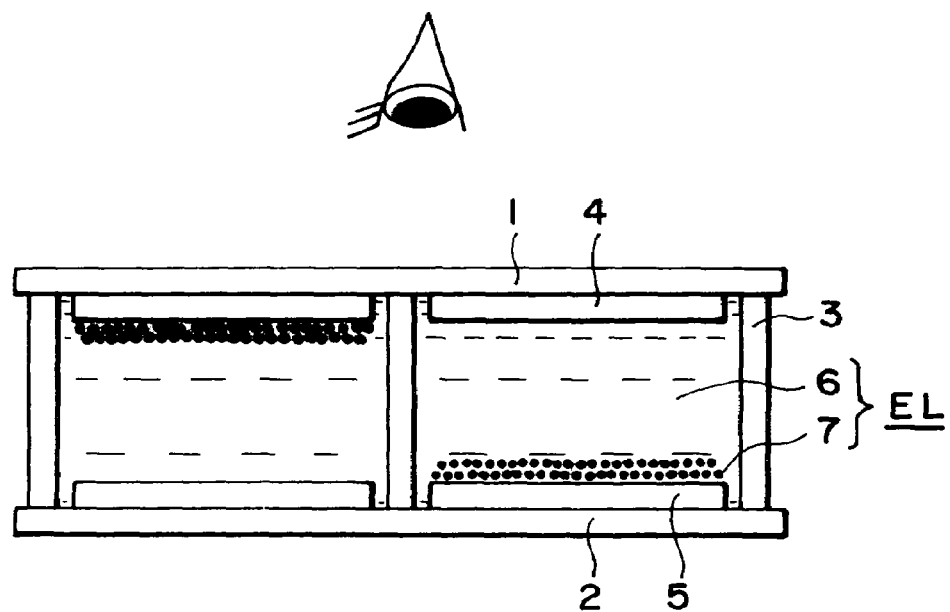
FIG. 7 is a schematic sectional view of a conventional electrophoretic display device.
Figure 8A:
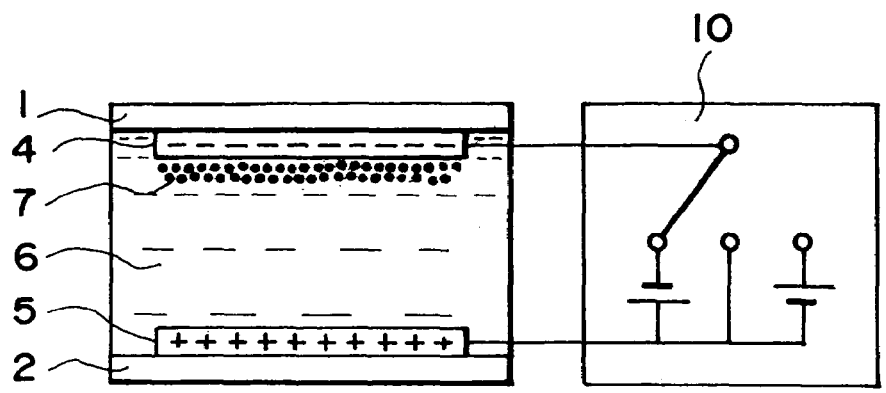
FIGS. 8A–8C are schematic sectional views for illustrating an operation principle of the conventional electrophoretic display device.
Figure 8B:
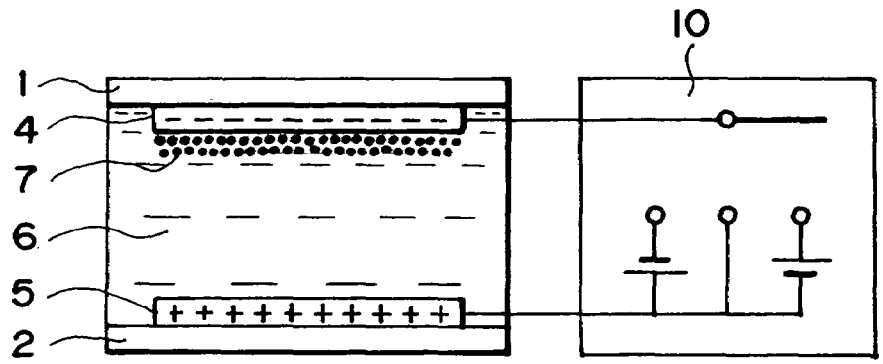
Figure 8C:
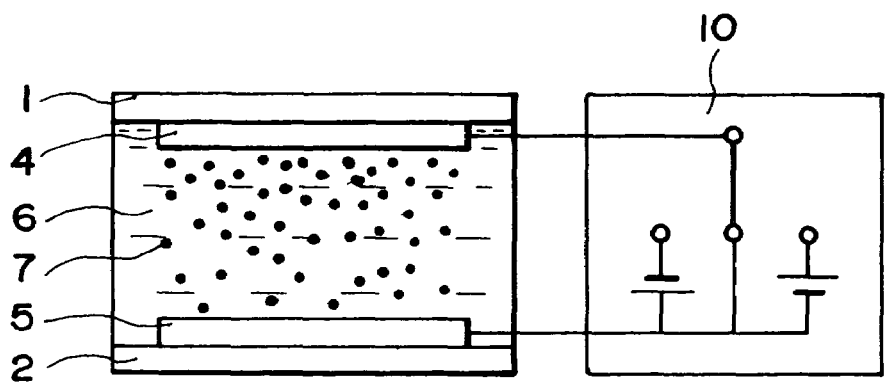

The effectiveness of the present invention is not restricted to the above-described organization but can be applied to any electrophoretic display device having a fixing surface or charged particles. Examples thereof may include: a display electrode/masking electrode-type display device as disclosed in JP-A 9-211499 and modified to include an adhesive layer on a fixing surface 14 as shown in FIG. 4; a horizontal movement-type display device as disclosed in JP-A 11-202804 (Appl. No. 10-005727) and modified to include an adhesive layer 8 on a fixing surface 14 as shown in FIG. 6; and a microcapsule-type display device as disclosed in JP-A 1-086116 including polymer capsules 12 containing an insulating layer 6 and modified to use adhesive colored charged particles 13 exhibiting a surface-adhesive colored charged particles 13 exhibiting a surface adhesiveness as shown in FIG. 6. Each cell can include 3 or more electrodes so as to provide at least one third electrode for controlling the movement of electrophoretic particles in addition to two drive electrodes as disclosed in U.S. Pat. No. 4,203,106 with further modification to provide one of the drive electrodes or the electrophoretic particle surface.

The organization of the adhesive layer will now be described in further detail.

Preferred examples of the material for the adhesive layer may include: poly(meth)acrylate esters, i.e., polymers of acrylic acid esters and methacrylic acid esters. Specific examples thereof may include: polyalkyl (meth)acrylates; such as polymethyl (meth)acrylate, polyethyl (meth)acrylate, polypropyl (meth)acrylate, poly-n-butyl (meth)acrylate, polyisobutyl (meth)acrylate, poly-t-butyl (meth)acrylate, polycyclohexyl (meth)acrylate; derivatives thereof, such as poly-2-hydroxypropyl (meth)acrylate, and poly-2,2,3,3-tetrafluoropropyl (meth)acrylate; and aromatic esters, such as polybenzyl (meth)acrylate.

Among these, it is preferred to use polymers having a glass transition temperature (Tg) of at most +35° C., more preferably at most room temperature, and at least –35° C. so as to exhibit an adhesiveness or tackiness at an operation temperature of the display device. An example of polymer having a low Tg is poly-n-butyl acrylate having a weight-average molecular weight according to GPC (gel permeation chromatography) of ca. $10^5$ exhibiting a Tg of –40 to –60° C.

Such poly-n-butyl acrylate is a viscous liquid at 25° C. and exhibits a tackiness, but the tackiness by itself is too high. Accordingly, it is preferred to use a copolymer of n-butyl acrylate with a monomer providing a polymer exhibiting a higher Tg. For example, copolymers of n-butyl acrylate and n-butyl methacrylate in appropriate proportions may have appropriate glass transition temperatures and adhesiveness.

Appropriate adhesiveness and peelability may also be controlled by copolymerizing, e.g., fluorine-containing esters, such as 2,2,3,3-tetrafluoropropyl acrylate; esters having a polar group, such as 2-hydroxypropyl acrylate; and other polar monomers, such as (meth)acrylic acid, (meth)acrylonitrile, methacrylamide, vinyl acetate and other esters. It is also possible to control the adhesiveness and peelability of these polymers by regulating molecular weight, orientation or crystallinity, and presence or absence of crosslinkage. In addition to copolymerization, it is possible to mix or laminate such adhesive polymers.

In addition to the above-mentioned arylate-based resins, it is also possible to use polymers predominantly comprising polymerized units of (meth)acrylic acid, (meth)acrylonitrile, (meth)acrylamide, vinyl esters and vinyl ethers.

Specific examples of (co)monomers providing such adhesive (co)polymers may include: styrene, o-methylstyrene, m-methylstyrene, p-methoxystyrene, p-ethylstyrene, p-t-butylstyrene, acrylic acid, methyl acrylate, ethyl acrylate, n-butyl acrylate, n-propyl acrylate, isobutyl acrylate, octyl acrylate, dodecyl acrylate, 2-ethylhexyl acrylate, stearyl acrylate, 2-chloroethyl acrylate, phenyl acrylate, methacrylic acid, methyl methacrylate, ethyl methacrylate, n-propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminomethyl methacrylate, diethylaminoethyl methacrylate, 2-hydroxyethyl methacrylate, acrylonitrile, methacrylonitrile, acrylamide, methyl vinyl ether, ethyl vinyl ether, propyl vinyl ether, n-butyl vinyl ether, isobutyl vinyl ether, β-chloroethyl vinyl ether, phenyl vinyl ether, p-methylphenyl vinyl ether, p-chlorophenyl vinyl ether, p-bromophenyl vinyl ether, p-nitrophenyl vinyl ether, p-methoxyphenyl vinyl ether, 2-vinylpyridine, 3-vinylpyridine, N-vinylpyrrolidone, 2-vinylimidazole, N-methyl-2-vinylimidazole, N-vinylimidazole, butadiene, fumaric acid, maleic acid, itaconic acid, and salts of these.

These polymers may be obtained by polymerization using various initiators, examples of which may include: azo or diazo-type polymerization initiators, such as 2,2'-azobis(2,4-dimethylvaleronitrile), 2,2'-azobisisobutylonitrile, 1,1'-azobis(cyclohexane-1-carbonitrile) and 2,2'-azobis-4-methoxy-2,4-dimethylvaleronitrile; and peroxide-type polymerization initiators, such as benzoyl peroxide, methyl ethyl ketone peroxide, diisopropyl peroxycarbonate, cumene hydroperoxide, 2,4-dichlorobenzoyl peroxide and lauroyl peroxide.

Adhesiveness or tackiness between two substances may be evaluated based on solubility parameters (SP values) of the two substances. Two substances having closer SP values may exhibit a better mutual solubility, and in case where one is solid, exhibit a better wettability (e.g., as disclosed in "Adhesive Handbook" published from Nikkan Kogyo Shimbun K.K.). Polymers may exhibit SP values over a broad range of from 6 of polytetra-fluoroethylene to 16 of polyacrylonitrile. Accordingly, in the present invention, it is preferred to select an adhesive layer material in view of the SP value of the materials constituting the fixing surface or the colored charged particles.

Figure 2:
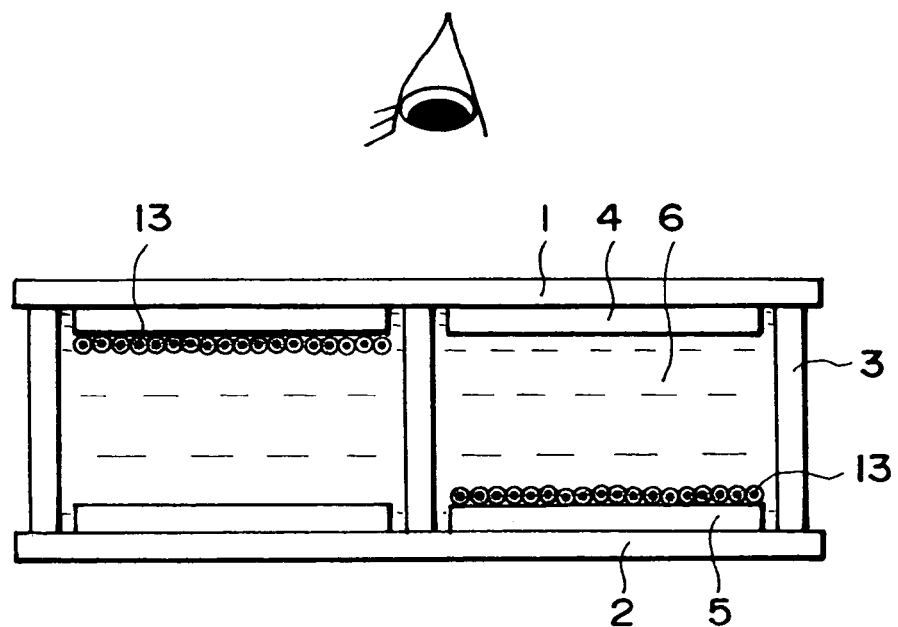
FIG. 2 is a schematic sectional view of another embodiment of the electrophoretic display device according to the invention.

The adhesive colored charged particles (e.g., 13 as shown in FIG. 2 or FIG. 6) used in the present invention can be formed by surface-coating colored charged particles with an adhesive layer but may suitably be composed of a colored adhesive material. More specifically, such adhesive colored particles may preferably be formed through suspension polymerization or emulsion polymerization while they can also be formed through bulk polymerization or solution polymerization.

The adhesion or adsorption force of such adhesive colored particles onto the fixing surface can be controlled to some extent by adjustment of average particle size. Particles having an average particle size of ca. 5 μm are liable to exhibit too strong an adhesive force onto the fixing surface and thus a lower peelability. On the other hand, particles having an average particle size exceeding ca. 70 μm have a smaller contact area with the fixing surface, thus posing a difficulty in ensuring an appropriate level of adhesion force. Accordingly, it is preferred to provide an average particle size in a range of ca. 5–70 μm.

In order to prevent agglomeration and ensure a dispersion state of colored particles during suspension or emulsion polymerization and in a colored insulating layer within the display device, it is preferred to add an appropriate dispersant.

Examples of such dispersant may include: polyvalent metal salts of phosphoric acid, such as calcium phosphate, aluminum phosphate and zinc phosphate; carbonic acid salts, such as calcium carbonate, and magnesium carbonate; other inorganic salts, such as calcium metal silicate, calcium sulfate, and barium sulfate; inorganic (hydro)oxides, such-as calcium hydroxide, magnesium hydroxide, aluminum hydroxide, silica, bentonite and alumina; surfactants, such as sodium dodecylbenzenesulfonate, sodium tetradecyl sulfate, sodium pentadecyl sulfate, sodium octyl sulfate, sodium oleate, sodium laurate, sodium stearate, and potassium stearate; and polymeric dispersants, such as polyvinylpyrrolidone and polyvinyl alcohol having various saponification degree and molecular weights.

Examples of colorants for coloring the charged particles may include: titanium oxide, carbon black, nigrosine, iron black, Aniline Blue, Chalcoil Blue, Chrome Yellow, Ultramarine Blue, Dupont Oil Red, Quinoline Yellow, Methylene Blue Chloride, Phthalocyanine Blue, Malachite Green Oxalate, Lamp Black, Rose Bengal, C.I. Pigment Red, C.I. Pigment Yellow, C.I. Pigment Blue, C.I. Direct Red 1, C.I. Direct Red 4, C.I. Acid Red 1, C.I. Basic Red 1, C.I. Mordant Red 30, C.I. Direct Blue 1, C.I. Direct Blue 2, C.I. Acid Blue 9, C.I. Acid Blue 15, C.I. Basic Blue 3, C.I. Basic Blue 5, C.I. Mordant Blue 7, C.I. Direct Green 6, C.I. Basic Green 4, C.I. Basic Green 6, Lead Yellow, Cadmium Yellow, Mineral Fast Yellow, Navre Yellow, Naphthol Yellow S, Hansa Yellow G, Permanent Yellow NCG, Turtradine Lake, Molybdenum Orange, Permanent Orange G, Cadmium Red, Permanent Red 4R, Watching Red Calcium salt, Brilliant Carmine 3B, Fast Violet B, Methyl Violet Lake, Ultramarine, Cobalt Blue, Alkali Blue Lake, Victoria Blue Lake, Quinacridone, Rhodamine B, Fast Sky Blue, Pigment Green B, Malachite Green Lake, and Final Yellow Green G.

It is also possible to use a magnetic colorant, examples of which may include: Be-ferrites, Sr-ferrite, Pb-ferrites, magnetite, gamma-$Fe_2O_3$ and a circular magnetic materials, such as Co-ferrites. These may be used alone or in mixture thereof or in mixture with soft ferrite particles.

The (adhesive) colored charged particles used in the present invention can optionally contain a charge control agent, inclusive of negative charge control agents, such as metal complex salts of monoazo dyes, and metal complex salts of salicylic acid, alkyl salicylic acids, dialkylsalicylic acids and naphtoic acid; and positive charge control agents, such as nigrosine compounds, and organic quaternary ammonium salts.

(Second Embodiment)

An electrophoretic display device according to this embodiment of the present invention is characterized by a cell structure, including: at least two electrodes, fixing surfaces each associated with one of the two electrodes, an electrophoretic layer disposed in the cell and comprising an insulating liquid and colored charged particles disposed in the electrophoretic layer, and voltage application means for applying a voltage between the electrodes thereby causing migration of the colored charged particles toward and collective attachment onto one of the fixing surfaces; the fixing surfaces are provided with a charged film having a constant surface charge of a polarity opposite to that of the colored charged particles.

The charged film may comprise a ferroelectric film or an electret film.

It is preferred that the insulating layer contains a polar ion-adsorbing agent, such as alumina or silica, so as to suppress the ion concentration in the insulating layer, thereby providing a high insulating property as represented by a volumetric resistivity of at least $10^{12}$ ohm.cm, preferably at least $10^{12}$–$10^{15}$ ohm.cm. As a result, the decrease in surface charge of the charged film due to ion adsorption becomes negligible.

Figure 9:
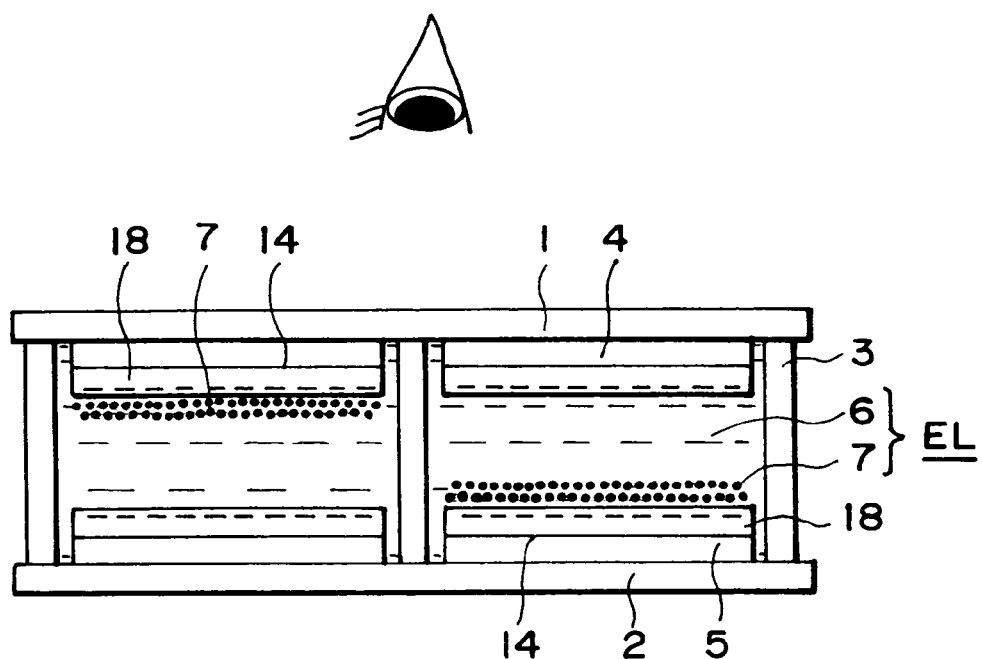
FIGS. 9–10 and 12–14 are schematic sectional views each showing another embodiment of the electrophoretic display device according to the invention.

FIG. 9 is a schematic sectional view of an embodiment of the electrophoretic display device according to the present invention. An electrophoretic display device shown in FIG. 9 includes two (closed) cell structures, each of which comprises a transparent (display-side) substrate 1, a counter substrate 2 and a partitioning wall 3 to form a cell, which is filled with an electrophoretic layer EL comprising a colored insulating layer 6 and colored charged particles 7 colored in a different color from the colored insulating layer 6. In each cell, the transparent display substrate 1 has thereon a transparent display electrode 4, and the counter substrate 2 has thereon a counter electrode 5. Each of the transparent display electrode 4 and the counter electrode 5 has a fixing surface 13 onto which the colored charged particles 7 are collectively attached. The fixing surface 13 is coated with a charged film 18 having a constant charge of a polarity (negative in the embodiment of FIG. 9) opposite to that of the colored charged particles 7.

Now, the operation principle for a unit cell of the display device will be described with reference to FIGS. 11A to 11C. As explained with reference to FIG. 9, each cell structure of the display device includes mutually opposing two substrates 1 and 2, a transparent display electrode 4 formed on the transparent display substrate 1, a counter electrode 5 formed on the counter electrode 2, a colored insulating layer 6 disposed between the opposing electrodes 4 and 5, colored charged particles 7 dispersed in the colored insulating layer 6 (and assumed herein to be positively charged), and charged films 18.

Figure 11A:
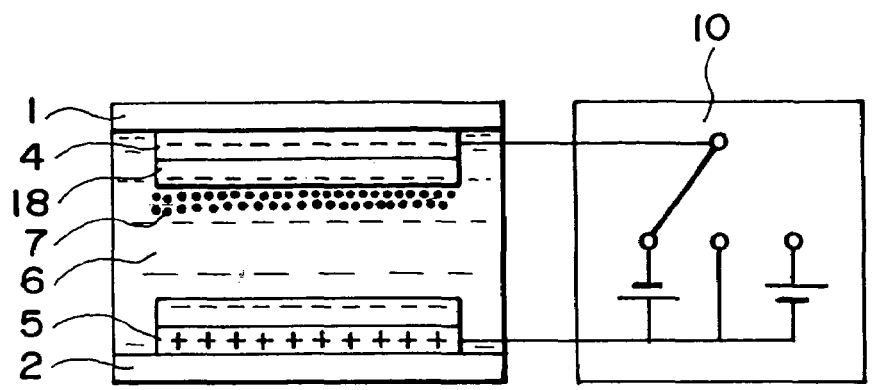
FIGS. 11A–11C are schematic sectional views for illustrating an operation principle of an embodiment of the electrophoretic display device according to the invention.

Now, if an external circuit 10 is connected as shown in FIG. 11A to induce a negative charge at the transparent display electrode 4 and a positive charge at the counter electrode 5, the positively charged colored charged particles 7 are collected and attached onto the transparent display electrode 4, whereby the display surface exhibits the color of the colored charged particles 7.

Figure 11B:
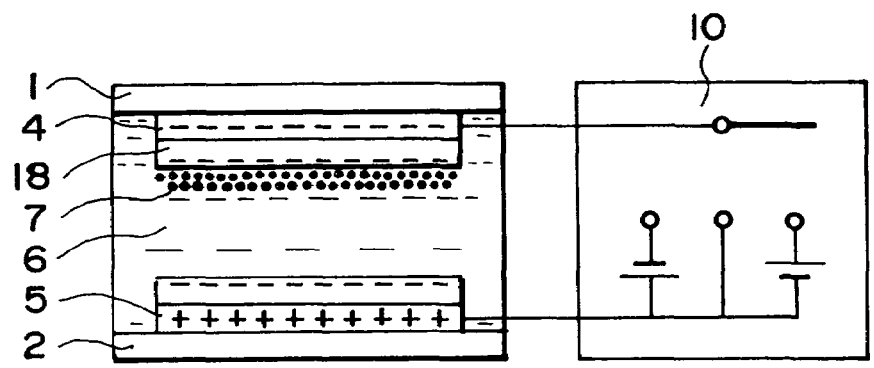

Then, if the external circuit is turned open as shown in FIG. 11B, the charges on the respective electrodes are retained, whereby the colored charged particles 7 are fixedly attached onto the transparent display electrode 4 due to an electrostatic attractive force exerted by the retained charge.

Figure 11C:
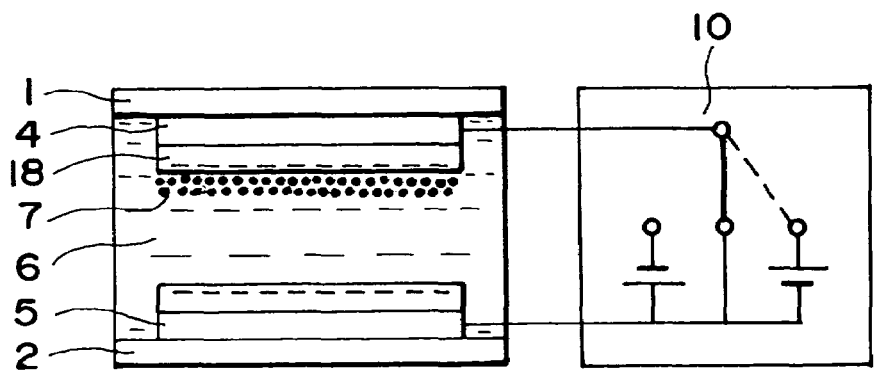

Now, if the external circuit 10 is short-circuited as shown in FIG. 11C, the charges retained at the electrodes 4 and 5 are released to lose the electrostatic attraction. In this state, however, the colored charged particles 7 are retained by an electrostatic force exerted by the negative charge held by the charged film 18 formed on the electrode 4, thus retaining the display state.

Accordingly, even in a drive system such as a simple matrix drive wherein the circuit-open state is not effectively retained, a good memory characteristic is exhibited. Further, as the surface charge on the charged film 18 is never released, a stable memory characteristic can be realized for a long period.

On the other hand, the rewriting of a display state is performed by peeling or separating the colored charged particles 7 from the charged film 18 on the electrode 4 by applying reverse-polarity voltages to the electrodes 4 and 5 by connecting the external circuit 10 as represented by a dotted line in FIG. 11C, i.e., to apply a positive charge to the electrode 4 and a negative charge to the electrode 5, so as to exert an energy exceeding a drive voltage threshold corresponding to the electrostatic force given by he charged film 18. In this way, by optimizing the electrostatic force exerted by the charged film 18, it becomes possible to design threshold characteristics essential for a simple matrix drive.

Figure 12:
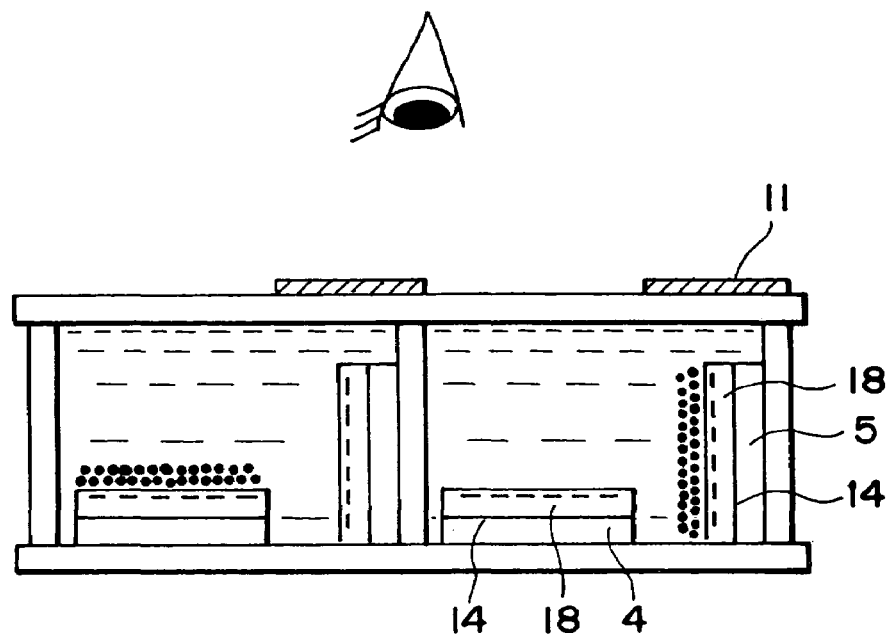
Figure 13:
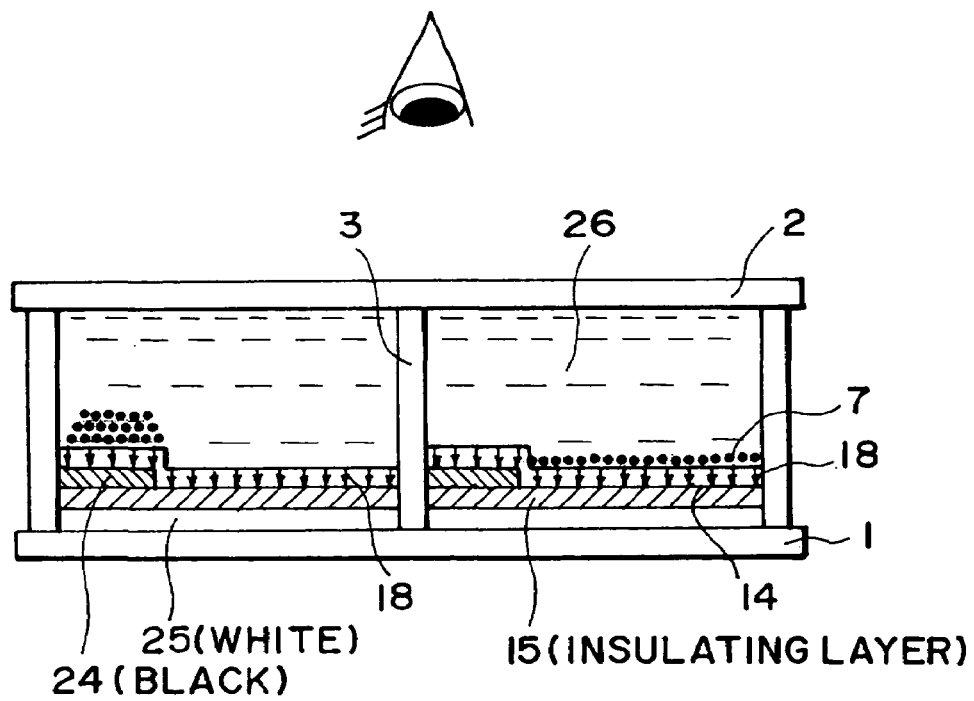
Figure 14:
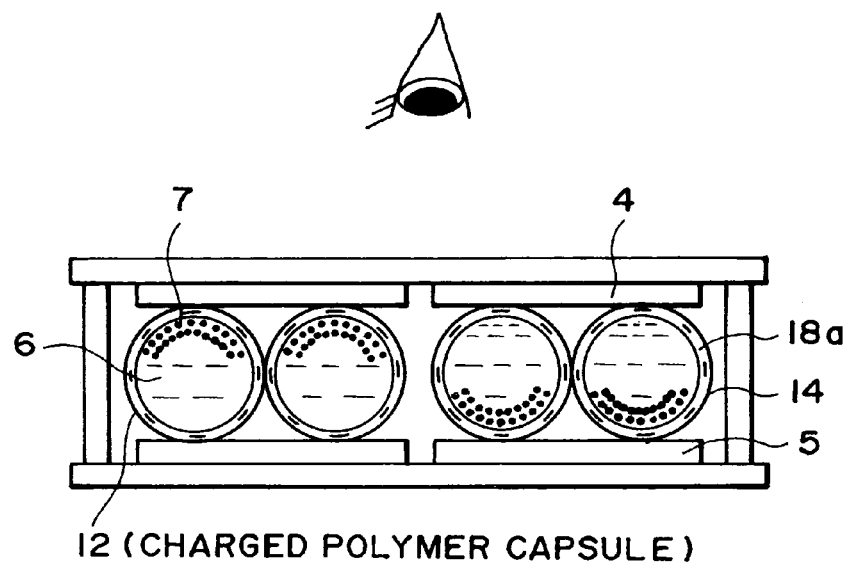

The effectiveness of the present invention is not restricted to the above-described organization but can be applied to any electrophoretic display device having a fixing surface or charged particles. Examples thereof may include: a display electrode/masking electrode-type display device as disclosed in JP-A 9-211499 and modified to include a charged film 18 on a fixing surface 14 as shown in FIG. 12; a horizontal movement-type display device as disclosed in JP-A 11-202804 (Appl. No. 10-005727) and modified to include a charge film 18 on a fixing surface 14 as shown in FIG. 13; and a microcapsule-type display device as disclosed in JP-A 1-086116 including polymer capsules 12a forming a fixing surface 14, containing an insulating layer 6 and colored charged particles 7 therein and also modified to be formed of charged films 18a as shown in FIG. 14, wherein the fixing surface 14 is given by an external surface of a microcapsule 12.

The charged film 18 may preferably comprise a ferroelectric material or an electret material.

Examples of the ferroelectric material suitably used in the present invention may include: inorganic compound, such as lead zirconate titanate (PZT), lanthanum-added lead zirconate titanate (PLZT), and barium titanate; and organic polymers, such as polyvinylidene fluoride (PVDF) and vinylidene fluoride-trifluoroethylene (VDF/TrFE) copolymer. By forming a charged film of such a ferroelectric material, it is possible to form a very large surface charge as large as 100–20000 nC/cm$^2$.

The electret-forming materials used in the present invention may include dielectric materials in general, inclusive of inorganic materials, such as glass, but may preferably comprise organic polymer materials capable of utilizing a printing process for the film formation in view of productivity. It is preferred to use fluorine-containing resins, such as polytetrafluoroethylene, tetrafluoroethylene-trifluoroethylene copolymer, polytetrafluoroethylene, FEP copolymer (tetrafluoroethylene-hexafluoropropylene copolymer), in view of performances, and it is also possible to suitably use other polymers, such as polyethylene, polypropylene, polystyrene, polymethyl methacrylate, polyvinyl chloride, polyethylene terephthalate, and polyimide. An electret film may desirably have a surface charge (density) of at least 5 nC/cm$^2$ and possibly ca. 50 nC/cm$^2$ at the maximum.

The significance of electret material is supplemented below. "Electret" has been named after "magnet" based on their similarity and is a material persistently retaining induced polarization to provide an external electric field thereof.

An electret is formed through polarization and retainment (or freezing) thereof. In this embodiment, the retainable or persistent polarization is representatively set up by (i) charge separation caused by microscopic or macroscopic displacement of ions contained in a paraelectric material, (ii) anisotropic alignment of intramolecular dipole composed of a polar group, etc., by an external electric field, or (iii) charge injection by corona discharge caused by a corona discharge electrode or occurring at gaps between an electrode and a dielectric.

Ion charge separation or a polarized charge by dipole alignment provides a hetero-charge of a polarity different from that of an external field application electrode, and a spatial charge caused by charge injection from an external electrode as by corona discharge provides a homo-charge of a polarity identical to that of the external electrode. According to measurement by a thermal stimulation current (TSC), the freezing or retainment of a polarization charge is considered to be caused by a deep trap, etc. of electrons, holes or ions present at non-aligned regions, such as crystal grain boundaries, within a paraelectric body, particularly a region close to the surface thereof.

Electret formation may be performed through various processes, inclusive of, e.g., the following processes:

(1) A paraelectric material heated to a proximity of softening temperature or melting temperature is cooled under application of a high DC electric field (thermo-electret process).

(2) Corona discharge onto a paraelectric material surface or a high DC electric field (up to ca. 10$^6$ V/cm) close to a breakdown voltage is applied across a paraelectric material at room temperature (electro-electret process).

(3) Irradiation of a paraelectric material with high-energy radiation (such as electron rays and gamma-rays) in vacuum (radio-electret process).

(4) Application of a high DC voltage onto a paraelectric material under photo-illumination (photo-electret process).

(5) Mechanical deformation as by pressurization, stretching, etc. (mechano-electret process).

Hereinbelow, some specific examples of the electrophoretic display device according to the present invention will be described.

EXAMPLE 1

FIG. 1 shows an example of electrophoretic display device including two closed cells each corresponding to a display segment (or pixel) and comprising two opposing electrodes 4 and 5 each having thereon an adhesive layer 8. More specifically, each cell is defined by a display-side transparent substrate 1, a counter substrate 2 and a partitioning wall 3, and is filled with an electrophoretic layer (EL)-forming mixture comprising a colored insulating liquid 6 and colored charged particles 7 dispersed in the insulating liquid 6. In each cell, the display-side transparent substrate 1 is provided with a transparent display electrode 4 and the counter substrate 2 is provided with a counter electrode 5. Each of the display electrode 4 and the counter electrode 5 is coated with an adhesive layer 8.

The electrophoretic display device may be produced along a process described hereinbelow.

Transparent display electrode 4 are formed on a transparent display substrate 1, and counter electrodes 5 are formed on a counter substrate 2. Each of the substrates 1 and 2 may be formed of a material showing a high transmittance for visible light and a high heat resistance, examples of which may include: inorganic materials, such as glass and quartz; and polymer films, such as polyethylene terephthalate (PET) and polyether sulfone (PES). In this example, glass substrates were used.

The transparent display electrode 4 may be formed of any transparent conductor material capable of patterning. In this example, a 200 nm-thick indium tin oxide (ITO) film was formed by vapor deposition and patterned into electrodes 4. The counter electrodes 5 may also be formed of such transparent conductor materials and also of metal conductor materials. In this example, a 200 nm-thick Al film was formed by vapor deposition and patterned into electrodes 5.

The adhesive layer 8 was formed of a n-butyl acrylate-n-butyl methacrylate copolymer. More specifically, 50 wt. parts of n-butyl acrylate and 50 wt. parts of n-butyl methacrylate were dissolved in toluene to form a 10 wt. %-solution, and 1 wt. % of 2,2'-azobisisobutylonitrile was added thereto as a polymerization initiator, followed by 3 hours of polymerization under heating at 70° C., to form a polymer solution.

The substrates 1 and 2 carrying the patterned electrodes 4 and 5, respectively, were coated with a resist so as to selectively expose the electrodes 4 and 5, and then coated with the polymer solution by spin coating, followed by evaporation of the solvent and removal of the resist to leave a ca. 500 nm-thick transparent adhesive layer 8 on each of the electrodes 4 and 5. The resultant polymer exhibited a glass transistor (Tg) of −15.4° C. as measured by using a differential scanning calorimeter ("DSC3100", mfd. by Mac Science K.K.).

Then, partitioning walls 3 are formed on the counter substrate 2. The partitioning walls 3 may suitably be formed of a polymer material through any processes, e.g., a process including a sequence of application of a photosensitive resin layer, exposure and wet development; a process of bonding separately produced partitioning walls; or a process of forming partitioning walls by molding on a light transmissive counter substrate 2. In this example, a process including application of photosensitive varnish, exposure and wet development was repeated in three cycles to form 50 $\mu$m-high partitioning walls 3.

Then, an electrophoretic layer-forming mixture comprising a colored insulating liquid 6 and colored charged particles 7 is placed within the partitioning walls. The colored insulating liquid 6 may be formed by dispersing or dissolving a colorant, such as dye, in an insulating liquid, such as silicone oil, toluene, xylene or high-purity kerosene. In this example, the colored insulating liquid 6 was formed by dispersing an anthraquinone-based black dye in silicone oil.

The colored charged particles 7 may comprise pigment particles or resin particles of e.g., polyethylene or polystyrene containing powdery pigment dispersed therein capable of being charged in the colored insulating liquid 6. The colored charged particles 7 may generally have an average particle size on the order of 0.1–50 $\mu$m. In this example, white particles having an average particle size of 0.5 $\mu$m and prepared by dispersing white powdery pigment (titanium oxide) in polyethylene particles. The white resinous particles 7 thus prepared were confirmed to be positively charged in the above-prepared colored insulating liquid 6.

Finally, the transparent substrate 1 was applied onto the partitioning walls 3 with a bonding agent to form a display device having a structure as shown in FIG. 1 including two closed cells each measuring ca. 500 $\mu$m×ca. 500 $\mu$m.

COMPARATIVE EXAMPLE 1

A display device was prepared in the same manner as in Example 1 except for omitting the adhesive layers 8.

(Operation)

The thus-prepared two display devices having similar structures as shown in FIG. 1 except for the presence or absence of the adhesive layers 8 were driven by a drive circuit (not shown). More specifically, first, the electrodes 4 of a left cell and a right cell of each device were supplied with −50 volts and +50 volts, respectively, relative to the counter electrodes 5. As a result, in the left cell, the positively charged white particles 7 were migrated and attached to the transparent display electrode 4 so that the cell displayed the white color of the attached charged particles 7, and in the right cell, the positively charged white particles 7 were migrated and attached to the counter electrode 5, whereby the right cell exhibited the black color of the colored insulating liquid 6. The response speed was 50 msec. The display devices of Example 1 and Comparative Example 1 exhibited similar drive characteristics.

When the external circuit was made open with respect to the display device of Comparative Example 1, no change was observed. However, after 5 hours of standing, a noticeable change in displayed colors was observed due to partial liberation and diffusion of the colored charged particles 7 from the fixing surfaces. Then, the external circuit was closed to apply the initial voltages thereby restoring the first display state, and then the transparent display electrode 4 and the counter electrode 5 were short-circuited, whereby almost all the colored charged particles were liberated and diffused into the liquid and the color display state was lost within several minutes.

Separately, when the display device of Example 1 in the color display state shown in FIG. 1 was similarly brought to the circuit open state, no change was observed at all even after 50 hours of standing. Then, the transparent display electrode 4 and the counter electrode 5 were short-circuited, whereby no change was observed at all even after 50 hours of standing, so that the realization of a good memory characteristic was confirmed.

The display devices of Example 1 and Comparative Example 1 were both subjected to application of rectangular pulse voltages of 50 msec and various amplitudes. As a result, the display device of Comparative Example 1 having no adhesive layers exhibited a switching threshold voltage of ca. 10 volts, whereas the display device of Example 1 exhibited an increased threshold voltage of 35 volts and remarkably improved gamma-characteristic. Further even after repetition of 100 cycles of switching by application of rectangular pulse voltages of 50 msec and ±50 volts, no change in drive characteristics was observed.

EXAMPLE 2

An electrophoretic display device having a structure as shown in FIG. 2 using adhesive colored charged particles 13 was prepared in the same manner as in Example 1 except for using the adhesive colored charged particles 13 instead of the colored charged particles 7, omitting the adhesive layers on the electrodes and using a colored insulating liquid 6 of isoparaffin ("Isopat", mfd. by Exxon Chemical America Co.) instead of the silicone oil.

The adhesive colored charged particles 13 were prepared as follows. A blend of 1.5 g of 99%-saponified PVA (polyvinyl alcohol) and 0.06 g of 90%-saponified PVA both having an average molecular weight of 500 was dissolved in 200 g of water under heating to form a PVA solution.

The PVA solution was mixed with 90 g of a monomer mixture of n-butyl acrylate/n-butyl methacrylate (50/50 by weight), 10 g of titanium oxide powder and 1 g of ammonium persulfate, and the mixture was cooled on ice in a nitrogen atmosphere, followed by dropwise addition of 1 g of tetramethylethylene-diamine under vigorous stirring and 12 hours of polymerization under the state. The reaction solution was poured into methanol, and the supernatant liquid was removed by decantation. The polymerizate was further washed with methanol and water to recover adhesive white particles, which exhibited Tg=−13.6° C. as measured by a differential scanning calorimeter ("DSC 3100", mfd. by Mac Science K.K.). The white particles were tacky particles at room temperature (25° C.).

The thus-prepared display device having a structure as shown in FIG. 2 was driven by a drive circuit (not shown). More specifically, first, the electrodes 4 of a left cell and a right cell of each device were supplied with −50 volts and +50 volts, respectively, relative to the counter electrodes 5. As a result, in the left cell, the positively charged white particles 13 were migrated and attached to the transparent display electrode 4 so that the cell displayed the white color of the attached charged particles 13, and in the right cell, the positively charged white particles 13 were migrated and attached to the counter electrode 5, whereby the right cell exhibited the black color of the colored insulating layer 6.

When the display device of this example in the color display state shown in FIG. 2 was brought to the circuit open state, no change was observed at all even after 50 hours of standing. Then, the transparent display electrode 4 and the counter electrode 5 were short-circuited, whereby no change was observed at all even after 50 hours of standing, so that the realization of a good memory characteristic was confirmed.

The display device of this example was subjected to application of rectangular pulse voltages of 50 msec and various amplitudes, whereby the display device exhibited a threshold voltage of 30 volts and a good gamma-characteristic similarly as in Example 1. Further even after repetition of 100 cycles of switching by application of rectangular pulse voltages of 50 msec and ±50 volts, no change in drive characteristics was observed.

EXAMPLE 3

This example is presented for describing the applicability of the present invention to a horizontal movement-type electrophoretic display device as disclosed in JP-A 11-202804 (Appl. No. 10-005727).

Figure 5:
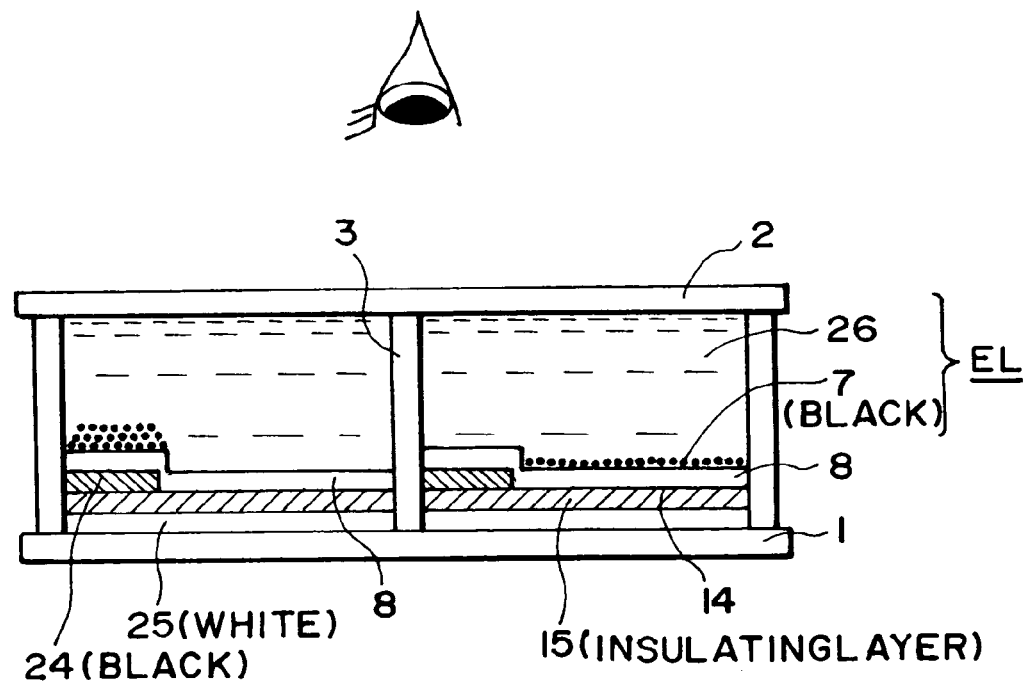

FIG. 5 is a schematic sectional view of a display device of this example including two closed cells, each corresponding to one pixel (or display segment). Referring to FIG. 5, in each cell, an entire pixel-forming surface of a display substrate 1 is provided with a white display electrode 25, on a part of which a black display electrode 24 is disposed via an insulating layer 15 covering the white display electrode 25. Further, a characteristic adhesive layer 8 of the present invention is formed on the black display electrode 24 and on a part of the insulating layer 15 above the white display electrode 25. A hollow cell surrounded by the display substrate 1, the counter substrate 2 and the partitioning walls 3 is filled with an electrophoretic layer (EL)-forming mixture comprising a transparent insulating liquid 26 and black charged particles 7 dispersed in the liquid 26. In each cell, the charged particle 7 are horizontally moved relative to the display substrate 1 and selectively collected on the black display electrode 24 or he white display electrode 24 above the display substrate to effect a display.

When the black charged particles 7 in the transparent insulating layer 26 are collected on the white display electrode 25 as shown in a aright cell by voltage application, the black charged particles 7 and the black display electrode 24 are observed (displayed) to the viewer through the transparent counter substrate 2. On the other hand, when the black charged particles 7 are collected on the black display electrode 24 as shown in the left cell by applying a voltage of a different polarity, the white display electrode 25 is observed to provide a white display state. If the white display electrode 25 is formed in a larger area than the black display electrode 24, the color of the white display electrode 25 provides a dominant display state. More exactly, the color of the white display electrode 25 may be determined by the color of the insulating layer 15, the white display electrode 25 per se or the display substrate 1 therebelow.

A specific display device of this example was prepared as follows. A display substrate 1 was formed of a 200 μm-thick translucent PET film. An ITO film was formed on the display substrate 1 and patterned into stripes to form white display electrodes 25, which were than coated with a white insulating layer 15 comprising PET with titanium oxide particles dispersed therein. Then, on the insulating layer 15, a dark-colored titanium carbide film was formed and patterned by photolithography including dry etching into 50 μm-wide stripes to form black display electrodes 24.

Then, an adhesive layer 8 was formed on the electrodes with a a n-butyl acrylate-n-butyl methacrylate copolymer. More specifically, 50 wt. parts of n-butylacrylate and 50 wt. parts of n-butyl methacrylate were dissolved in toluene to form a 10 wt. %-solution, and 1 wt. % of 2,2'-azobisisobutylonitrile was added thereto as a polymerization initiator, followed by 3 hours of polymerization under heating at 70° C., to form a polymer solution. The polymer solution was then applied by spin coating over the black display electrodes 24 and the insulating layer 25 above the white display electrodes 25 to form a ca. 500 nm-thick adhesive layer 8, which exhibited a Tg of −15.4° C.

The display substrate 1 was further coated with a 50 μm-thick photosensitive resist ("SU-8", mfd. by 3M Co.), followed by exposure and wet development to form partitioning walls 3 of 50 μm in height. Then, a layer of heat-bonding adhesive was applied on top of the partitioning walls 3, and the respective cells surrounded by the partitioning walls 3 were filled with a mixture of a transparent insulating liquid 26 of silicone oil and black charged particles 7 of a polystyrene-carbon mixture and 1–2 μm in particle size. To the silicone oil, 0.5 wt. % each of alumina and silica fine particles had been added as polar ionadsorbers. Separately, a pattern of heat-bonding agent layer was applied on a counter substrate 2, and the counter substrate 2 was superposed on the display substrate 1 with alignment of the heat-bonding agent layer to the partitioning walls 3, followed by heat-bonding to form a display device having a structure as shown in FIG. 5 providing two display segments each measuring ca. 200 μm×ca. 200 μm.

COMPARATIVE EXAMPLE 2

Accomparative display device was prepared in the same manner as in Example 3 except for forming a ca. 500 nm-thick polyimide film instead of the adhesive layer 8.

(Operation)

The thus-prepared two display devices having similar structures as shown in FIG. 5 except for the difference of the adhesive layer 8 or the polyimide film were driven by a drive circuit (not shown). More specifically, first, the black display electrodes 24 of a left cell and a right cell of each device were supplied with −50 volts and +50 volts, respectively, relative to the white display electrodes 25 placed at a ground potential. As a result, in the left cell, the positively charged black particles 7 were migrated and attached to the black display electrode 24 so that the cell displayed the white color of the display electrode 25, and in the right cell, the positively charged black particles 7 were migrated and attached to the white display electrode 25, whereby the right cell exhibited the black color of the colored charged particles 7 and the black display electrode 24. The response speed was 50 msec. The display devices of Example 3 and Comparative Example 2 exhibited similar drive characteristics.

When the external circuit was made open with respect to the display device of Comparative Example 2, no change was observed. However, after 5 hours of standing, a noticeable change in displayed colors was observed due to partial liberation and diffusion of the colored charged particles 7 from the fixing surfaces. Then, the external circuit was closed to apply the initial voltages thereby restoring the first display state, and then the black display electrode 24 and the white display electrode 25 were short-circuited, whereby almost all the colored charged particles were liberated and diffused into the liquid and the color display state was lost within several minutes.

Separately, when the display device of Example 3 in the color display state shown in FIG. 5 was similarly brought to the circuit open state, no change was observed at all even after 50 hours of standing. Then, the black display electrode 24 and the white display electrode 25 were short-circuited, whereby no change was observed at all even after 50 hours of standing, so that the realization of a good memory characteristic was confirmed.

The display devices of Example 3 and Comparative Example 2 were both subjected to application of rectangular pulse voltages of 50 msec and various amplitudes. As a result, the display device of Comparative Example 2 having no adhesive layers exhibited a switching threshold voltage of ca. 5 volts, whereas the display device of Example 3 exhibited an increased threshold voltage of 35 volts and remarkably improved gamma-characteristic. Further even after repetition of 100 cycles of switching by application of rectangular pulse voltages of 50 msec and ±50 volts, no change in drive characteristics was observed.

As is understood from the above examples, according to the present invention, even in a drive system such as a simple matrix drive wherein the circuit-open state is not effectively retained, a good memory characteristic is exhibited. Further, as the surface charge on the adhesive layer is never released, a stable memory characteristic an be realized for a long period. Further, a threshold voltage corresponding to an adsorption or attachment energy on the adhesive layer is imparted whereby an electrophoretic display device having a remarkably improved gamma-characteristic is realized.

EXAMPLE 4

FIG. 9 shows an example of electrophoretic display device including two closed cells each corresponding to a display segment (or pixel) and comprising two opposing electrodes 4 and 5 each having thereon a charged layer 18. More specifically, each cell is defined by a display-side transparent substrate 1, a counter substrate 2 and a partitioning wall 3, and is filled with an electrophoretic layer (EL)-forming mixture comprising a colored insulating liquid 6 and colored charged particles 7 dispersed in the insulating liquid 6. In each cell, the display-side transparent substrate 1 is provided with a transparent display electrode 4 and the counter substrate 2 is provided with a counter electrode 5. Each of the display electrode 4 and the counter electrode 5 is coated with a charged layer 18.

The electrophoretic display device may be produced along a process described hereinbelow. In this specific example, the charged film 18 was formed of a tetrafluoro-ethylene-hexafluoropropylene copolymer film and converted into an electret by corona discharge at an elevated temperature.

First of all, transparent display electrodes 4 were formed on a transparent display substrate 1, and counter electrodes 5 were formed on a counter substrate 2. Each of the substrates 1 and 2 may be formed of a material showing a high transmittance for visible light and a high heat resistance, examples of which may include: inorganic materials, such as glass and quartz; and polymer films, such as polyethylene terephthalate (PET) and polyether sulfone (PES). In this example, glass substrates were used.

The transparent display electrode 4 may be formed of any transparent conductor material capable of patterning. In this example, a 200 nm-thick indium tin oxide (ITO) film was formed by vapor deposition and patterned into electrodes 4. The counter electrodes 5 may also be formed of such transparent conductor materials and also of metal conductor materials. In this example, a 200 nm-thick Al film was formed by vapor deposition and patterned into electrodes 5.

The respective electrodes were subjected to 5 min of Ar etching for surface roughening to provide an improved film adhesion, and then 5 μm-thick teflon-FEP (tetrafluoroethylene-hexafluoropropylene copolymer) transparent sheets were superposed onto the electrode-retaining surfaces of the respective substrates, followed by application of a load thereon, heating to 300° C. for melt-bonding of the sheets and gradual cooling to form a 5 μm-thick coating of the sheet over the electrodes.

Then, the teflon-FEP sheets were coated with a resist left in the pattern of the segments, and the exposed portions of the sheets were removed together with the electrodes therebelow by successive etching with oxygen plasma and Ar plasma, thus leaving segment electrode patterns coated with the 5 μm-thick teflon-FEP film.

The substrates carrying the film-coated electrodes were disposed within a thermostat chamber together with a knife edge electrode attached to an XYZ-displacement drive mechanism. The knife edge electrode was disposed with a gap opposite to the teflon-FEP film surface. After setting the gap at 200 μm, the temperature Within the chamber was held at 300° C. and a voltage of –5 kV was applied to the knife edge electrode relative to the electrode below the teflon-FEP film to cause corona discharge between the electrodes while moving the knife edge electrode parallel to the film surface reciprocally at a constant speed to expose the entire teflon-FEP film surface uniformly to the corona discharge, followed by quenching with dry nitrogen to complete an electret-forming treatment.

The thus treated teflon-FEP film exhibited a good transparency and also a surface potential of ca. 35 volts below that of the respective electrodes, where the formation of charged films 18 on each of the transparent display electrodes 4 and the counter electrodes 5.

Then, partitioning walls 3 were formed on the counter substrate 2. The partitioning walls 3 may suitably be formed of a polymer material through any processes, e.g., a process including a sequence of application of a photosensitive resin layer, exposure and wet development; a process of bonding separately produced partitioning walls; or a process of forming partitioning walls by molding on a light transmissive counter substrate 2. In this example, a process including application of photosensitive varnish, exposure and wet development was repeated in three cycles to form 50 μm-high partitioning walls 3.

Then, an electrophoretic layer-forming mixture comprising a colored insulating liquid 6 and colored charged particles 7 was placed within the partitioning walls. The colored insulating liquid 6 may be formed by dispersing or dissolving a colorant, such as dye, in an insulating liquid, such as silicone oil, toluene, xylene or high-purity kerosene. In this example, the colored insulating liquid 6 was formed by dispersing an anthraquinone-based black dye in silicone oil, and 0.5 wt. % each of ultrafine alumina and silica particles were added thereto as polar ion adsorbents.

The colored charged particles 7 may comprise pigment particles or resin particles of e.g., polyethylene or polystyrene containing powdery pigment dispersed therein capable of being charged in the colored insulating liquid 6. The colored charged particles 7 may generally have an average particle size on the order of 0.1–50 μm. In this example, white particles having an average particle size of 0.5 μm and prepared by dispersing white powdery pigment (titanium oxide) in polyethylene particles were used. The white resinous particles 7 thus prepared were confirmed to be positively charged in the above-prepared colored insulating liquid 6.

Finally, the transparent substrate 1 was applied onto the partitioning walls 3 with a bonding agent to form a display device having a structure as shown in FIG. 1 having two display segments each measuring ca. 500 μm×ca. 500 μm.

COMPARATIVE EXAMPLE 3

A display device was prepared in the same manner as in Example 4 except for omitting the electret-forming treatment to the teflon-FEP film on the electrodes.

(Operation)

The thus-prepared two display devices having similar structures as shown in FIG. 5 except for the presence or absence of negative charge on the films 18 were driven by a drive circuit (not shown). More specifically, first, the electrodes 4 of a left cell and a right cell of each device were supplied with −50 volts and +50 volts, respectively, relative to the counter electrodes 5. As a result, in the left cell, the positively charged white particles 7 were migrated and attached to the transparent display electrode 4 so that the cell displayed the white color of the attached charged particles 7, and in the right cell, the positively charged white particles 7 were migrated and attached to the counter electrode 5, whereby the right cell exhibited the black color of the colored insulating liquid 6. The response speed was 50 msec. The display devices of Example 4 and Comparative Example 3 exhibited similar drive characteristics.

When the external circuit was made open with respect to the display device of Comparative Example 3, no change was observed. However, after 5 hours of standing, a noticeable change in displayed colors was observed due to partial liberation and diffusion of the colored charged particles 7 from the fixing surfaces. Then, the external circuit was closed to apply the initial voltages thereby restoring the first display state, and then the transparent display electrode 4 and the counter electrode 5 were short-circuited, whereby almost all the colored charged particles were liberated and diffused into the liquid and the color display state was lost within several minutes.

Separately, when the display device of Example 4 in the color display state shown in FIG. 5 was similarly brought to the circuit open state, no change was observed at all even after 50 hours of standing. Then, the transparent display electrode 4 and the counter electrode 5 were short-circuited, whereby no change was observed at all even after 50 hours of standing, so that the realization of a good memory characteristic was confirmed.

Then, the respective cells were supplied with opposite-polarity voltages, whereby the cells exhibited respectively inverted display colors. Accordingly, it was confirmed that the adsorption by the charged films exerted little adverse effects to the drive characteristic.

EXAMPLE 5

Figure 10:
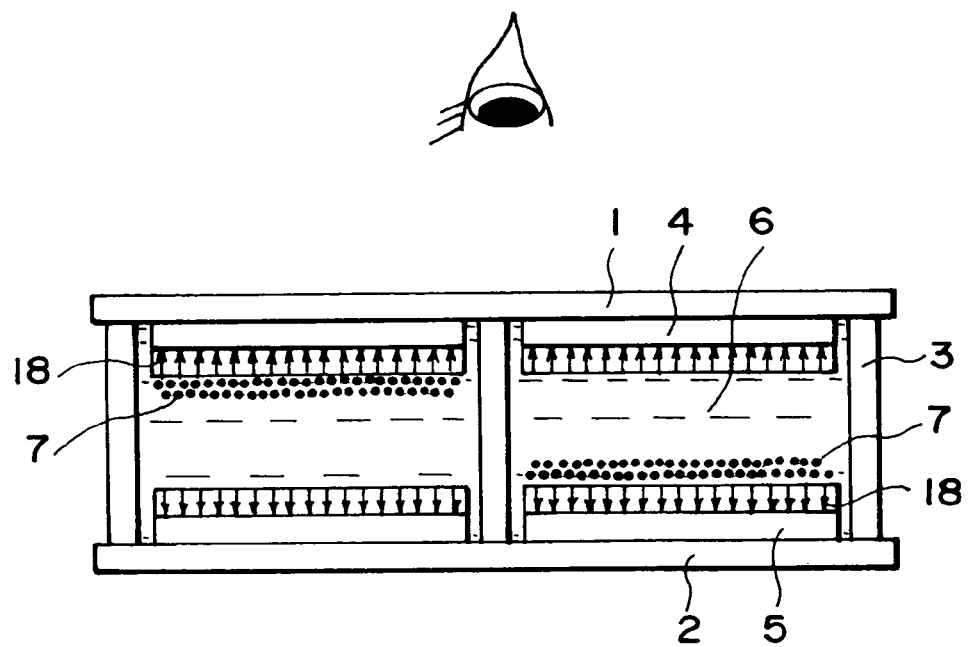

An electrophoretic display device having a structure as shown in FIG. 10 sing charged films 18 comprising an inorganic dielectric of lanthanum-added lead zirconate titanate (PLZT) was prepared in the same manner as in Example 4 except for using the charged film 18 instead of the electret films 18 of teflon-FEP in Example 4. FIG. 10 shows a state of the charged films 18 wherein dipole moments in respective polarization domain in a dielectric phase are uniformly oriented toward the substrates.

The PLZT charged films 18 were prepared in the following manner. PLZT films may be formed through a sol-gel process, sputtering or a CVD (chemical vapor deposition) process. The PLZT films 18 in this example were prepared by sputtering.

Each of quartz glass-made substrates 1 and 2 carrying transparent electrodes 4 and Pt-made counter electrodes 5 was coated with a 250 nm-thick PLZT (lanthanum-added lead zirconate titanate) in a stoichiometric compositional ratio by high-frequency sputtering.

The deposited amorphous PLZT film was selectively heat-treated at 550–650° C. for 1 min. by illumination with light from a halogen lamp to be perovskite-form crystal structure showing ferroelectricity. The thus-formed PLZT ferroelectric film exhibited a transmittance of ca. 70%. The PLET film was formed into desired patterns by resist patterning and dry etching.

Then, above the PLZT film on each substrate, a parallel plate metal electrode was disposed with a gap of 200 μm, and the PLZT film under heating at 90° C. was subjected to poling by applying a voltage of −1 kV to the transparent display electrodes 4 (or Pt-counter electrodes 5) relative to the parallel plate metal electrode, thereby forming charged films 18.

By using the substrates 1 and 2 provided with the charged films of PLZT, a display device having a structure shown in FIG. 10 and two display segments each measuring ca. 200 μm×ca. 200 μm was prepared thereafter in the same manner as in Example 4.

The thus-prepared display device was driven by a drive circuit (not shown). More specifically, first, the electrodes 4 of a left cell and a right cell of each device were supplied with −50 volts and +50 volts, respectively, relative to the counter electrodes 5. As a result, in the left cell, the positively charged white particles 7 initially dispersed in the black insulating liquid 6 were migrated and attached to the transparent display electrode 4 so that the cell displayed the white color of the attached charged particles 7, and in the right cell, the positively charged white particles 7 were migrated and attached to the counter electrode 5, whereby the right cell exhibited the black color of the colored insulating liquid 6. The response speed was 50 msec.

When the display device of Example 5 in the color display state shown in FIG. 10 was brought to a circuit open state, no change was observed at all even after 50 hours of standing. Then, the transparent display electrode 4 and the counter electrode 5 were short-circuited, whereby no change was observed at all even after 50 hours of standing, so that the realization of a good memory characteristic was confirmed.

EXAMPLE 6

This example is presented for describing the applicability of the present invention to a horizontal movement-type electrophoretic display device as disclosed in JP-A 11-202804 (Appl. No. 10-005727).

FIG. 13 is a schematic sectional view of a display device of this example including two closed cells, each corresponding to one pixel (or display segment). Referring to FIG. 13, in each cell, an entire pixel-forming surface of a display substrate 1 is provided with a white display electrode 25, on a part of which a black display electrode 24 is disposed via an insulating layer 15 covering the white display electrode 25. Further, a characteristic charged film 18 of the present invention is formed on the black display electrode 24 and on a part of the insulating layer 15 above the white display electrode 25. A hollow cell surrounded by the display substrate 1, the counter substrate 2 and the partitioning walls 3 is filled with an electrophoretic layer (EL)-forming mixture comprising a transparent insulating liquid 26 and black charged particles 7 dispersed in the liquid 26. In each cell, the charged particle 7 are horizontally moved relative to the display substrate 1 and selectively collected on the black display electrode 24 or the white display electrode 24 above the display substrate to effect a display.

When the black charged particles 7 in the transparent insulating liquid 26 are collected on the white display electrode 25 as shown in a aright cell by voltage application, the black charged particles 7 and the black display electrode 24 are observed (displayed) to the viewer through the transparent counter substrate 2. On the other hand, when the black charged particles 7 are collected on the black display electrode 24 as shown in the left cell by applying a voltage of a different polarity, the white display electrode 25 is to provide a white display state. If the white display electrode 25 is formed in a larger area than the black display electrode 24, the color of the white display electrode 25 provides a dominant display state. More exactly, the color of the white display electrode 25 may be determined by the color of the insulating layer 15, the white display electrode 25 per se or the display substrate 1 therebelow.

A specific display device of this example was prepared as follows. A display substrate 1 was formed of a 200 μm-thick translucent PET film. An ITO film was formed on the display substrate 1 and patterned into stripes to form white display electrodes 25, which were then coated with a white insulating layer 15 comprising PET with titanium oxide particles dispersed therein. Then, on the insulating layer 15, a dark-colored titanium carbide film was formed and patterned by photolithography including dry etching into 50 μm-wide stripes to form black display electrodes 24.

Then, a charged film 18 was formed on the electrodes with polyvinylidene fluoride (PVDF) as a polymeric ferroelectric material. More specifically, PVDF in a pellet form was dissolved in dimethylacetamide (DMA) to form a 10 wt. % solution which was then cast over the black display electrodes 24 and the insulating layer 15 on the white display electrodes and patterned to form a 2 μm-thick PVDF film on the electrodes.

Then, above the PVDF film on the display substrate 1, a parallel plate metal electrode was disposed with a gap of 200 μm, and the PVDF film under heating at 100° C. was subjected to poling by applying a voltage of +1 kV to the black display electrodes 24 and the white display electrodes 25 relative to the parallel plate metal electrode for ca. 15 min, followed by cooling to room temperature to form charged films 18.

The display substrate 1 was further coated with a 50 μm-thick photosensitive resist ("SU-8", mfd. by 3M Co.), followed by exposure and wet development to form partitioning walls 3 of 50 μm in height. Then, a layer of heat-bonding adhesive was applied on top of the partitioning walls 3, and the respective cells surrounded by the partitioning walls 3 were filled with a mixture of a transparent insulating layer 26 of silicone oil and black charged particles 7 of a polystyrene-carbon mixture and 1–2 μm in particle size. To the silicone oil, 0.5 wt. % each of alumina and silica fine particles had been added as polar ion-adsorbers. Separately, a pattern of heat-bonding agent layer was applied on a counter substrate 2, and the counter substrate 2 was superposed on the display substrate 1 with alignment of the heat-bonding agent layer to the partitioning walls 3, followed by heat-bonding to form a display device having a structure as shown in FIG. 5 and two display segments each measuring ca. 200 μm×ca. 200 μm.

COMPARATIVE EXAMPLE 4

A comparative display device was prepared in the same manner as in Example 6 except for forming a ca. 2 μm-thick polyimide film without poling instead of the poled PVDF films 18.

(Operation)

The thus-prepared two display devices of Example 6 and Comparative Example 4 having similar structures as shown in FIG. 10 except for the use of the poled PVDF-film 18 and the non-poled polyimide film 18 were driven by a drive circuit (not shown). More specifically, first, the black display electrodes 24 of a left cell and a right cell of each device were supplied with −50 volts and +50 volts, respectively, relative to the white display electrodes 25 placed at a ground potential. As a result, in the left cell, the positively charged black particles 7 were migrated and attached to the black display electrode 24 so that the cell displayed the white color of the display electrode 25, and in the right cell, the positively charged black particles 7 were migrated and attached to the white display electrode 25, whereby the right cell exhibited the black color of the charged particles 7 and the black display electrode 24. The response speed was 50 msec. The display devices of Example 6 and Comparative Example 4 exhibited similar drive characteristics.

When the external circuit was made open with respect to the display device of Comparative Example 4, no change was observed. However, after 5 hours of standing, a noticeable change in displayed colors was observed due to partial liberation and diffusion of the colored charged particles 7 from the fixing surfaces. Then, the external circuit was closed to apply the initial voltages thereby restoring the first display state, and then the black display electrode 24 and the white display electrode 25 were short-circuited, whereby almost all the colored charged particles were liberated and diffused into the liquid and the color display state was lost within several minutes.

Separately, when the display device of Example 6 in the color display state shown in FIG. 13 was similarly brought to the circuit open state, no change was observed at all even after 50 hours of standing. Then, the black display electrode 24 and the white display electrode 25 were short-circuited, whereby no change was observed at all even after 50 hours of standing, so that the realization of a good memory characteristic was confirmed.

As is understood from the above examples, according to the present invention, even in a drive system such as a simple matrix drive wherein the circuit-open state is not effectively retained, a good memory characteristic is exhibited. Further, as the surface charge on the charged layer is never released, a stable memory characteristic can be realized for a long period.

What is claimed is:

1. An electrophoretic display device of a cell structure, comprising:
   at least two electrodes;
   fixing surfaces each associated with one of said at least two electrodes;

an electrophoretic layer disposed in the cell and comprising an insulating liquid and colored charged particles disposed in said electrophoretic layer; and voltage application means for applying a voltage between said electrodes thereby causing migration of said colored charged particles toward, and collective attachment onto, one of said fixing surfaces, wherein said fixing surfaces are provided by a charged film formed on the associated electrodes, said charged film having a constant surface charge of a polarity opposite to that of said colored charged particles regardless of a polarity of electricity supplied to the associated electrodes.

2. A display device according to claim 1, wherein said charged film is formed on said fixing surfaces given by said electrodes.

3. A display device according to claim 1, wherein said charged film comprises a ferroelectric material or an electric material.

4. A display device according to claim 1, wherein said insulating liquid has a volumetric resistivity of at least $10^{12}$ ohm.cm.

5. A display device according to claim 1, wherein said two electrodes are oppositely disposed in the cell structure so as to allow vertical movement of said colored charged particles between said electrodes.

6. A display device according to claim 1, wherein said two electrodes are disposed on an identical plane in the cell structure so as to allow horizontal movement parallel to the plane of said colored charged particles.

* * * * *

UNITED STATES PATENT AND TRADEMARK OFFICE
CERTIFICATE OF CORRECTION

| | | |
|---|---|---|
| PATENT NO. | : 7,009,756 B2 | |
| APPLICATION NO. | : 10/876539 | |
| DATED | : March 7, 2006 | |
| INVENTOR(S) | : Etsurō Kishi et al. | |

It is certified that error appears in the above-identified patent and that said Letters Patent is hereby corrected as shown below:

ON THE TITLE PAGE, AT (75), INVENTORS:
    "Etsuro" should read --Etsurō--.

ON THE TITLE PAGE, AT (57), ABSTRACT:
    Line 6, "trades" should read --trodes,--.

IN THE DRAWINGS, SHEET 3:
    Figure 5, "(INSULATINGLAYER)" should read --(INSULATING LAYER)--.

COLUMN 2:
    Line 11, "layer EL" should read --Layer EL.--.
    Line 15, "tens" should read --tens of--.

COLUMN 3:
    Line 51, "For comply" should read --To comply--.
    Line 55, "acid" should read --acid,--.

COLUMN 6:
    Line 65, "such-as" should read --such as--.

COLUMN 7:
    Line 5, "degree" should read --degrees--.
    Line 29, "a circular" should read --acircular--.

COLUMN 8:
    Line 60, "by he" should read --by the--.

COLUMN 12:
    Line 37, "Isopat" should read --Isopar--.

COLUMN 13:
    Line 41, "particle 7" should read --particles 7--.
    Line 43, "he" should read --the--.
    Line 48, "aright" should read --right--.

COLUMN 14:
    Line 6, "a a" should read --a--.
    Line 38, "Accomparative" should read --A comparative--.

UNITED STATES PATENT AND TRADEMARK OFFICE
CERTIFICATE OF CORRECTION

PATENT NO. : 7,009,756 B2
APPLICATION NO. : 10/876539
DATED : March 7, 2006
INVENTOR(S) : Etsurō Kishi et al.

It is certified that error appears in the above-identified patent and that said Letters Patent is hereby corrected as shown below:

COLUMN 15:
 Line 29, "an" should read --can--.

COLUMN 16:
 Line 27, "Within" should read --within--.

COLUMN 17:
 Line 64, "sing" should read --using--.

COLUMN 19:
 Line 10, "particle 7" should read --particles 7--.
 Line 16, "aright" should read --a right--.

Signed and Sealed this

Twelfth Day of September, 2006

JON W. DUDAS
*Director of the United States Patent and Trademark Office*